United States Patent
Matsushita et al.

(10) Patent No.: US 8,909,302 B2
(45) Date of Patent: Dec. 9, 2014

(54) IN-VEHICLE APPARATUS

(75) Inventors: Suguru Matsushita, Obu (JP); Soichi Saito, Nagoya (JP); Ryuuji Sakata, Kariya (JP); Shinichi Yamamoto, Toyota (JP); Kazushige Hayashi, Toyota (JP); Masao Sasaki, Okazaki (JP)

(73) Assignee: Denso Corporation, Kariya (JP)

( * ) Notice: Subject to any disclaimer, the term of this patent is extended or adjusted under 35 U.S.C. 154(b) by 656 days.

(21) Appl. No.: 13/200,158

(22) Filed: Sep. 20, 2011

(65) Prior Publication Data
US 2012/0071096 A1    Mar. 22, 2012

(30) Foreign Application Priority Data

Sep. 21, 2010   (JP) ................................ 2010-210723

(51) Int. Cl.
  *H04M 1/00* (2006.01)
  *H04M 1/60* (2006.01)
  *H04W 4/04* (2009.01)

(52) U.S. Cl.
  CPC ............ *H04M 1/6075* (2013.01); *H04W 4/046* (2013.01); *H04M 2250/02* (2013.01)
  USPC ................... 455/569.1; 455/569.2; 455/41.2; 455/41.3

(58) Field of Classification Search
  CPC .................................................. H04B 1/3822
  USPC .......................................... 455/569.1, 569.2
  See application file for complete search history.

(56) References Cited

U.S. PATENT DOCUMENTS

| | | | |
|---|---|---|---|
| 8,606,335 B2 * | 12/2013 | Ozaki | 455/569.2 |
| 2005/0070336 A1 * | 3/2005 | Tamura | 455/567 |
| 2009/0061769 A1 | 3/2009 | Zimbric et al. | |
| 2010/0210315 A1 * | 8/2010 | Miyake | 455/569.2 |
| 2010/0210316 A1 | 8/2010 | Okayasu | |
| 2010/0210317 A1 * | 8/2010 | Kakehi | 455/569.2 |
| 2013/0029604 A1 | 1/2013 | Saito et al. | |

FOREIGN PATENT DOCUMENTS

| | | |
|---|---|---|
| JP | 2003-92643 | 3/2003 |
| JP | 2007-281652 | 10/2007 |
| JP | 2010-187289 | 8/2010 |
| WO | WO 2009/032571 | 3/2009 |

OTHER PUBLICATIONS

U.S. Appl. No. 13/200,171, filed Sep. 20, 2011, Matsushita et al.
Office Action dated Nov. 22, 2013 in corresponding Chinese Application No. 201110290709.6.
Office Action dated Oct. 22, 2013 in corresponding JP Application No. 2010-210723.
Office Action dated Apr. 22, 2014 in corresponding Chinese Application No. 201110290709.6.

(Continued)

*Primary Examiner* — Wen Huang
(74) *Attorney, Agent, or Firm* — Harness, Dickey & Pierce, PLC

(57) ABSTRACT

When connecting a multi-profile device by Bluetooth, an in-vehicle apparatus performs a MAP connection establishment process in succession to an HFP connection establishment process to have a MAP connection established earlier than a conventional timing, thereby reducing a waiting period before receiving a new message arrival notification from the multi-profile device through the MAP connection.

4 Claims, 2 Drawing Sheets

(56) References Cited

OTHER PUBLICATIONS

Office Action dated Aug. 5, 2014 in the corresponding CN application No. 201110290709.6 with English translation.

Office Action issued Aug. 1, 2013 in corresponding CN Application No. 201110290742.9 (with English translation).

* cited by examiner

IN-VEHICLE APPARATUS

CROSS REFERENCE TO RELATED APPLICATION

The present application is based on and claims the benefit of priority of Japanese Patent Application No. 2010-210723, filed on Sep. 21, 2010, the disclosure of which is incorporated herein by reference.

TECHNICAL FIELD

The present disclosure generally relates to an in-vehicle apparatus that communicates with an HFP type device by a short range communication according to a Bluetooth standard.

BACKGROUND

A short range wireless communication technique known as "Bluetooth" allows multiple profile connections (i.e. multi-profile connections) between two devices. During such multi-profile connections, simultaneous use of two or more data communication type profiles substantially slows down a communication speed of each of those profiles, due to exhaustion of required bandwidth for the data communication.

Therefore, the data communication type profile of the Bluetooth standard is connected under an exclusive control to, for example, a Bluetooth enabled cellular phone. In patent document JP-A-2003-92643, the specification discloses that a dial-up networking profile (DUN) connection is prioritized among multiple data communication type profiles.

However, in a situation where a message access profile (MAP) has not been established between the cellular phone and the in-vehicle apparatus, a "new massage arrival notification", which notifies a user that the cellular phone has received a message, cannot be delivered/transmitted to the in-vehicle apparatus. In other words, because a current MAP standard defines the "new message arrival notification" as a real-time notification mechanism for delivering the notification in real-time, in order for the in-vehicle apparatus to receive such new message arrival notification the establishment of a MAP connection must have been finished and the in-vehicle apparatus must be in a new message arrival notification waiting condition when a new message is received by the cellular phone.

Therefore, until after a completion of another data communication type profile, which has a higher connection priority than the MAP connection, the in-vehicle apparatus cannot receive the "new message arrival notification" from the cellular phone even when the cellular phone is receiving a new message, indicating that there is a long waiting period from a connection establishment of the cellular phone to a delivery of the new message arrival notification.

SUMMARY

In view of the above and other problems, the present disclosure provides an in-vehicle apparatus that has a reduced waiting period before receiving a new message arrival notification from a multi-profile device when connecting to the multi-profile device through Bluetooth.

Specifically, an in-vehicle apparatus capable of connecting multiple profiles to a pre-registered multi-profile device according to a Bluetooth standard, the apparatus may include: a first connection unit that establishes an HFP profile connection to the multi-profile device for realizing an incoming call notification from the multi-profile device when the multi-profile device receives an incoming call; a second connection unit that establishes a MAP profile connection to the multi-profile device for realizing a new message arrival notification when the multi-profile device receives a new data message; a third connection unit for performing a predetermined data communication with the multi-profile device by connecting a data communication type profile other than the MAP profile; and a connection operation controller exclusively operates one of the second connection unit or the third connection unit after the first connection unit receives the incoming call notification.

In an aspect of the present disclosure, the in-vehicle apparatus connects a hands-free profile (HFP) to the multi-profile device for giving a top priority in realizing an incoming call waiting condition for receiving a call from the multi-profile device, and connects to the multi-profile device MAP which is used for data communication for receiving a new message arrival notification, before connecting other data communication type profiles. In such a manner, a new message non-notification period, during which the new message arrival notification could not be delivered due to a priority given to connecting to the other data communication type profile, is now available as a new message notifiable period for receiving the new message arrival notification. In other words, a waiting period (a) from the connection establishment to the multi-profile device such as a cellular phone (b) to enablement of delivery of the new message arrival notification is reduced.

According to the present disclosure, the data communication type profile is quickly connected.

Further, according to the present disclosure, the data communication type profile can be more quickly connected.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The present disclosure is explained in the following with reference to the drawings.

Figure 1:
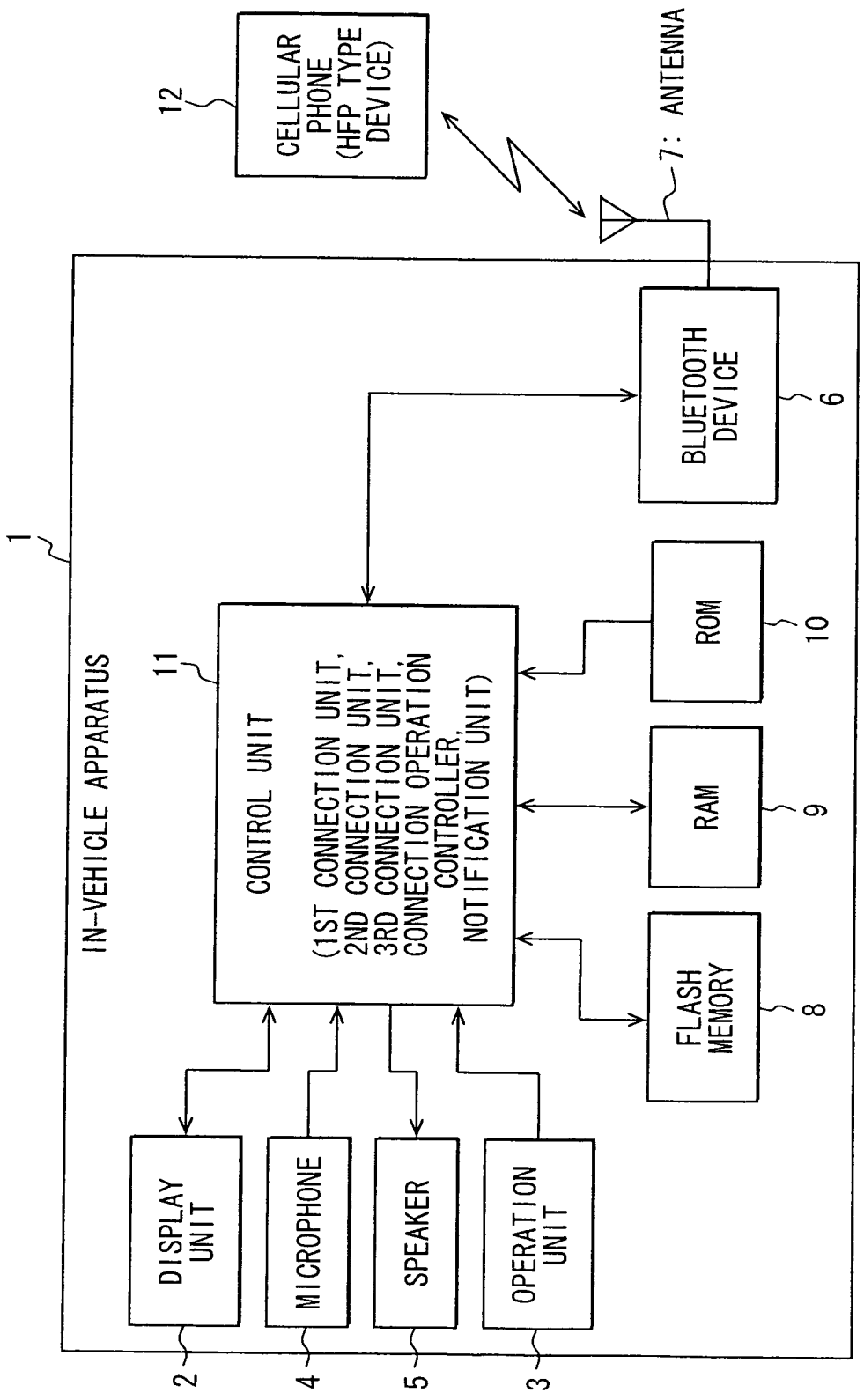
FIG. 1 is a block diagram of an in-vehicle apparatus of the present disclosure.

With reference to FIG. 1, an in-vehicle apparatus 1 includes a display unit 2, an operation unit 3, a microphone 4, a speaker 5, a Bluetooth device 6, an antenna 7, a flash memory 8, a RAM 9, a ROM 10 and a control unit 11. The control unit includes a CPU as its main component for realizing a hands-free function. The control unit 11 may be equivalent to a first connection unit, a second connection unit, a third connection unit, a connection operation controller, and a communication unit in claims.

The display unit 2 is a liquid crystal display, and displays text data, image data, and the like that are inputted from the control unit 11. The operation unit 3 is a mechanical switch or a touch panel, and outputs a signal based on a user operation by the user on the control unit 11. The microphone 4 converts the sound that a user has uttered into a voice signal, and outputs the signal to the control circuit 11. The speaker 5 outputs, as a sound, a voice signal input from the control circuit 11.

The Bluetooth device 6 outputs data to the control circuit 11. The Bluetooth device 6 receives a signal from antenna 7, and based on the Bluetooth standard, the Bluetooth device 6 processes the signal by performing a frequency conversion, a demodulation, an amplification, and an A/D conversion. Additionally, the Bluetooth device 6 also outputs a signal that contains data from the control circuit 11 by D/A converting, amplifying, modulating, and frequency-converting the data from the control circuit 11. In the present embodiment, the Bluetooth device 6 is configured to connect to a cellular phone 12 (i.e. a multi-profile device in claims), where the cellular phone 12 includes a Bluetooth communication function for short range wireless communication.

The flash memory 8 is a rewritable nonvolatile storage medium that is capable of storing a telephone book data that indicates relationships between telephone numbers and people's names corresponding thereto.

The control circuit 11 retrieves, from the ROM 10, a program for the operation of the in-vehicle apparatus 1, and the retrieved program is executed by the control circuit 11. In the course of execution of the program, the data is written in the flash memory 8 or the RAM 9, and the data is retrieved from the flash memory 8, the RAM 9, or the ROM 10. In addition, in the course of operation, the control circuit 11 receives input signals from the operation unit 3, the microphone 4, and the Bluetooth device 6, and outputs a signal to the speaker 5 and the Bluetooth device 6.

The cellular phone 12, which connects to the in-vehicle apparatus 1 through Bluetooth connection, has a function to connect to the Bluetooth device 6, in addition to a normal cellular phone function. In addition, the cellular phone 12 includes HFP, and functions as DUN defined in the Bluetooth standard.

The cellular phone 12 maybe categorized as a multi-profile handling type cellular phone or a multi-profile non-handling type cellular phone. The multi-profile handling type cellular phone is capable of handling simultaneous operations for multiple profiles, such as, HFP, DUN, and the like. The multi-profile non-handling type cellular phone is capable of handling only one operation at a time for one profile. In the present embodiment, the in-vehicle apparatus 1 is assumed to connect to the multi-profile type cellular phone. Therefore, in the following description, the cellular phone 12 is assumed to be a multi-profile type cellular phone.

Figure 2:
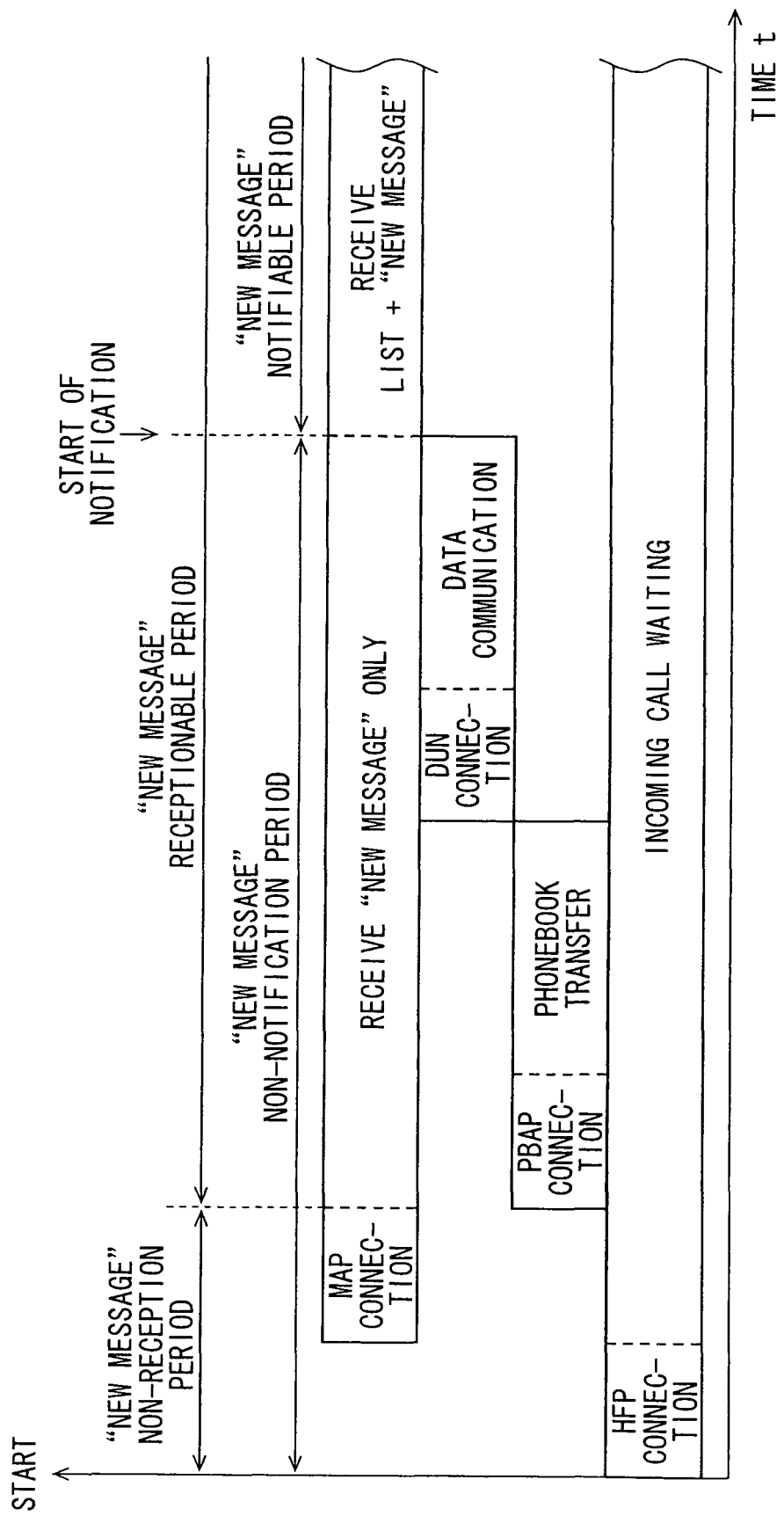
FIG. 2 is an illustration of a connection process of the in-vehicle apparatus of FIG. 1 with a multi-profile-device.

FIG. 2 is an illustration of a connection process for connecting multiple profiles to the cellular phone 12 by the control unit 11. The cellular phone 12 is assumed to have pairing information (i.e. a device registration) in the in-vehicle apparatus 1.

When an ignition switch is operated to turn on a power supply for the vehicle accessories, the control unit 11 receives a power supply for its operation. If the user of the vehicle carries the cellular phone 12 and enters the vehicle, the control unit 11 establishes a Bluetooth connection to the cellular phone 12. The HFP connection is established in order to provide the user with the hands-free profile function. The HFP connection is established first in order to quickly notify the user of any incoming calls to the cellular phone 12.

The control unit 11 determines whether an incoming call notice or notification, which indicates the cellular phone 12 is receiving an incoming call, has been received through the antenna 7 and the Bluetooth device 6. When the control unit 11 receives the incoming call notice from the cellular phone 12, the control unit 11 controls the display unit 2 and/or the speaker 5 to notify the user of the incoming call. For example, the display unit 2 may display information regarding the incoming call, such as a telephone number of the incoming call and the associated name or other attributes that are stored in the flash memory 8. Further, the speaker 5 may provide an output of a ring tone of the incoming call.

After displaying the above-described message regarding the incoming call, the control circuit 11 outputs a signal that allows the user to answer the incoming call (i.e. start the call or conversation) based on an off-hook operation on the operation unit 3 by the user. The signal of starting the call is transmitted to the cellular phone 12 through the Bluetooth device 6. When the cellular phone 12 receives the signal, the cellular phone establishes a communication channel for the incoming call, and notifies the in-vehicle apparatus 1 of such operation. When the control unit 11 receives such notification from the Bluetooth device 6, the control unit 11 realizes the hands-free telephone call by using the established communication channel.

Additionally, when the user would like to place a call to a certain telephone number, the in-vehicle apparatus 1 receives a signal based on the user operation of the operation unit 3. The in-vehicle apparatus 1, through the Bluetooth device 6, requests the cellular phone 12 to place or initiate a call to the telephone number included in the above signal. The cellular phone 12 places the call to the telephone terminal, and transmits to the in-vehicle apparatus 1 a notification of establishing the call with the telephone terminal. The control circuit 11 receives the communication channel establishment notification through the Bluetooth device 6, and realizes the call to the telephone terminal through the established communication channel.

More practically, when the cellular phone 12 receives a calling voice signal from the telephone terminal (i.e. from a call partner), the signal is transmitted to the in-vehicle apparatus 1. When the control circuit 11 outputs a received calling voice signal to the speaker 5 as a voice signal, the calling voice is outputted from the speaker 5 toward the user. Further, when the control circuit 11 receives a caller voice signal from a vehicle occupant through the microphone 4, the caller voice signal is transmitted through the Bluetooth device 6 to the cellular phone 12. When the cellular phone 12 receives the caller voice signal, the cellular phone 12 relays and transmits the caller voice signal to the telephone terminal on the call partner side. In such manner, a hands-free telephone call is realized by using the in-vehicle apparatus 1 and the cellular phone 12.

Further, after establishing the HFP connection to the cellular phone 12, the control unit 11 establishes the MAP wireless connection. The MAP is a profile for acquiring a message list that lists messages being received by the cellular phone 12, and for receiving a new message arrival notification that indicates a reception of a new message. FIG. 2 refers to the "new message arrival notification" as the "new message".

The MAP is configured to receive the new message arrival notification only, and is configured not to receive the message list. Further, in receiving the new message arrival notification, the in-vehicle apparatus holds the new message arrival notification by not informing the user about the new messages. Such on-hold operation provides other data communication profiles, which may have a higher priority, to establish a connection with the cellular phone 12, because the new message arrival notification is not required to have real-timeness by nature. The "message" in the above context may include a message in a short message service (SMS), in a multi-media service (MMS), in an e-mail (electronic mail) service or the like at this point. However, the "message" may further include, in concept, a message in newly provided services in the future.

The above-described operation scheme realizes an operation condition that simultaneously connects both the HFP and the MAP as wireless connections, that is, a multi-profile connected condition that enables (a) a real-time notice of having an incoming call and (b) notifying the user of only a new message arrival notification.

When the control unit 11 establishes the multi-profile connection of the HFP and the MAP to the cellular phone 12, the control unit 11 uses wireless connection of a phone book access profile (PBAP), which is a data communication type of profile, and transfers a telephone book registered in the cellular phone 12 to the in-vehicle apparatus 1. After the completion of the phone book transfer, the control unit 11 establishes a wireless connection of a dial-up networking profile (DUN). By using the Bluetooth device 6, the control unit 11 transmits a signal for requesting a DUN connection to the cellular phone 12, and waits to receive a DUN connection response from the cellular phone 12 through the Bluetooth device 6, which may indicates an "OK" response to such request signal.

When the in-vehicle apparatus 1 receives an "OK" response for a request of a DUN connection, the in-vehicle apparatus 1 proceeds to perform a process for starting a data communication process. In other words, the in-vehicle apparatus 1 transmits through the Bluetooth device 6 a signal that requests the cellular phone 12 to place a telephone call to a certain access point (e.g., ATD of an AT command). The access point allows access to a wide area network such as the Internet for data exchange with a communication device on the wide area network (e.g., a request and an acquisition of a WEB page according to an http protocol), and stores the acquired data in the flash memory 8, or displays the acquired data on the display unit 2.

For example, when the user operates the operation unit 3 to indicate an end of the data communication, the control unit 11 determines that the data communication has finished, and continuously performs a process that disconnects the wireless connection of the DUN. More practically, after transmitting a signal that requests for disconnection of the DUN to the cellular phone 12 through the Bluetooth device 6 and receiving a response that indicates an "OK" to such disconnection request, the control unit 11 finishes the DUN connection. At this point, the wireless connection of only the HFP and the MAP is in an established condition between the in-vehicle apparatus 1 and the cellular phone 12. After disconnecting from the DUN, real-time reception and notification of (a) the "incoming call notice" by the HFP connection and (b) the "new message arrival notification" by the MAP connection are enabled, together with the enablement of real-time acquisition of received messages including a new message list.

Since the MAP connection is performed in succession to the HFP connection when the cellular phone 12 is connected by Bluetooth, the MAP connection is connected at an earlier timing or stage in comparison to a conventional timing, thereby resulting in a reduction of a waiting period before the enablement of the reception of the "new message arrival notification" from the cellular phone 12.

Further, when the new message arrival notification has been received through the MAP connection, the received new message arrival notification is configured to be kept on hold (i.e not delivered to the user) until after the end of all of the other data communication type profiles. Therefore, the data communication by using the PBAP or DUN will not be interrupted, thereby enabling such data communication process to be finished quickly.

Furthermore, because the message list is configured to be acquired from the cellular phone 12 after finishing all data communication type profiles, the PBAP or the DUN can be more quickly performed.

Other Embodiments

Although the present disclosure has been fully described in connection with preferred embodiment thereof with reference to the accompanying drawings, it is to be noted that various changes and modifications will become apparent to those skilled in the art.

For example, an HFP type device is not limited only to a cellular phone. In other words, any device may be usable as long as the HFP connection and the MAP connection of the Bluetooth standard is connectable.

Furthermore, a profile is usable in the present disclosure as long as the profile is defined in a category of an Interoperability Profile, such as a File Transfer Profile (FTP), a Head Set Profile (HSP), a Human Interface Profile (HIP), a LAN Access Profile (LAP), an Object Push Profile (OPP), a Personal Networking Profile (PNP), and the like.

Furthermore, the in-vehicle apparatus 1 of the present disclosure may be realized as a vehicle navigation apparatus.

Such changes, modifications, and summarized schemes are to be understood as being within the scope of the present disclosure as defined by appended claims.

What is claimed is:

1. An in-vehicle apparatus capable of connecting multiple profiles to a pre-registered multi-profile device according to a Bluetooth standard, the apparatus comprising:
 a first connection unit that establishes an HFP profile connection to the multi-profile device for realizing an incoming call notification from the multi-profile device when the multi-profile device receives an incoming call;
 a second connection unit that establishes a MAP profile connection to the multi-profile device for realizing a new message arrival notification when the multi-profile device receives a new data message;
 a third connection unit for performing a predetermined data communication with the multi-profile device by connecting a data communication type profile other than the MAP profile;
 a connection operation controller exclusively operates one of the second connection unit or the third connection unit after the first connection unit receives the incoming call notification; and
 a communication unit to inform a user of reception of the new message arrival notification, wherein
 when the new message arrival notification is received by the second connection unit during the operation of the third connection unit, the communication unit notifies the user of the new message arrival notification after an end of the operation of the third connection unit.

2. The in-vehicle apparatus of claim 1, wherein after the operation of the third connection unit is complete, the second connection unit receives a list of messages from the multi-profile device.

3. The in-vehicle apparatus of claim 1, wherein the multi-profile device is a cellular phone.

4. The in-vehicle apparatus of claim 1, wherein the third connection unit establishes a PBAP (Phone Book Access Profile) or a DUN (Dial-Up Network Profile).

* * * * *